March 20, 1934.  L. S. PADDOCK  1,951,436
MEAT CURING METHOD
Filed Dec. 24, 1931
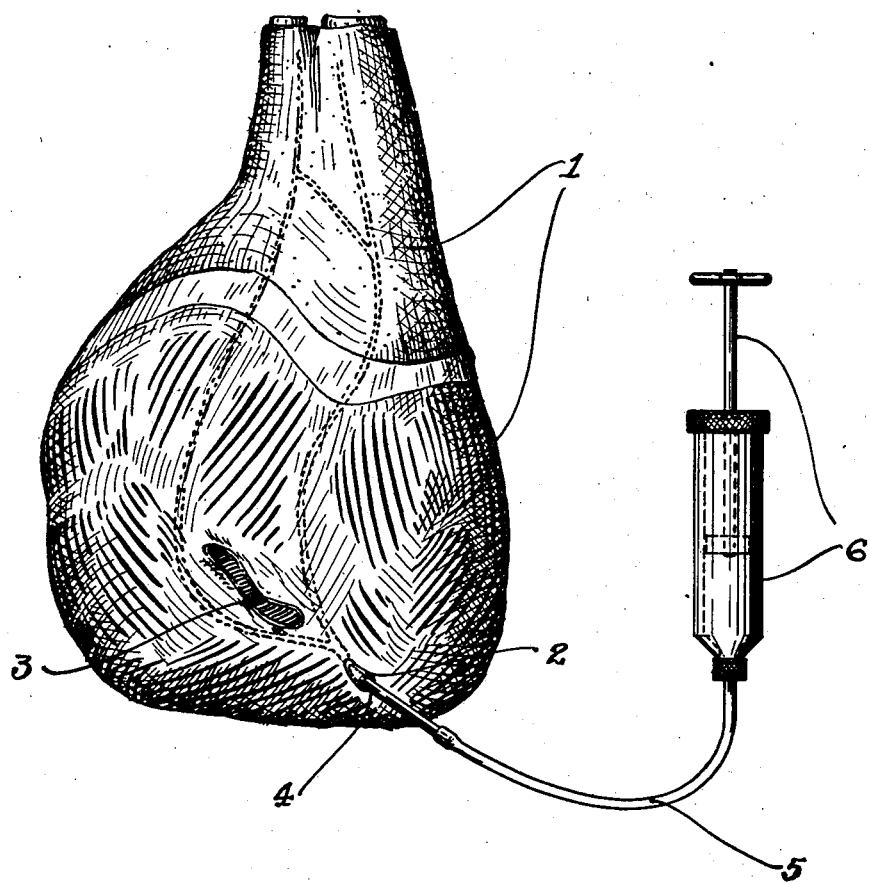
L. Scott Paddock
INVENTOR Patented Mar. 20, 1934

1,951,436

UNITED STATES PATENT OFFICE 1,951,436

MEAT CURING METHOD

Levi Scott Paddock, Chicago, Ill., assignor to Swift and Company, Chicago, Ill., a corporation of Illinois Application December 24, 1931, Serial No. 582,917

3 Claims. (Cl. 99—1)

This invention relates to meat curing methods and particularly to the curing of such meat portions as hams, briskets, tongues, and the like.

One of the objects of this invention is to provide a method whereby meat may be quickly cured.

Another object of this invention is to provide a method whereby meat may be more uniformly cured throughout its bulk.

Another object of this invention is to provide a curing method whereby meat may be cured without the necessity for the conventional soaking operation for curing. Other objects of the invention will be apparent from the description and claims which follow:

In the accompanying drawing, the inside surface of the ham 1 is shown with the iliac artery 2 protruding slightly above the surface behind the aitchbone 3. The iliac artery 2 branches immediately below the surface of the ham, as is shown diagrammatically in dotted lines. A nipple 4 is shown inserted in the exposed portion of the iliac artery. The nipple 4 is shown in the drawing as being fed through line 5 leading from pump 6.

In practicing the present invention, the iliac artery 2 is exposed at the time of butchering. The nipple 4 is inserted into the artery and the curing pickle pumped into the artery through line 5 leading from pump 6. In the preferred method of practising this invention, the hogs are butchered in the usual manner, care being taken to avoid destruction of the iliac artery. In other respects, the hams are trimmed and chilled to the proper temperature as in ordinary practice. Green hams, after butchering, are ordinarily chilled to a temperature of from 32° to 34° Fahrenheit to assure a uniformly low temperature throughout. This temperature results in the ham being somewhat too rigid for satisfactory pumping, and in the preferred practice of this invention the hams are raised to a temperature of 38° to 40° Fahrenheit, at which temperature the pumping operation may be successfully carried out without danger of spoilage which would result if the temperature were carried very much above this point.

In the actual operation, the iliac artery 2 is dissected out and nipple 4, which may be similar to a hypodermic needle, is inserted into the artery and held in place by the operator while the curing pickle is pumped into the ham. It will be understood, of course, that any pickle formula may be used. I find in practice, however, that a very satisfactory formula consists of a fully saturated sodium chloride solution containing seven per cent or eight per cent sugar, 0.2% sodium nitrite and 0.2% sodium nitrate.

A very satisfactory product has been produced in the practice of this invention by pumping this particular curing pickle into the ham at a pressure of ten pounds until the ham has taken up ten per cent of its orginal weight. The amount of pickle used may be altered in order to produce a stronger or milder cure as may be desired. After the ham is pumped, it is immersed in a regular curing pickle for two or three days, after which the product is ready for smoke.

The present invention secures a more uniform cure than is possible by the ordinary curing method of permitting the product to remain immersed for several weeks in the curing pickle, since the immersion method of curing tends to develop a high concentration of curing agents in the outer portions of the product. Attempts to lessen this concentration by subsequent soaking ordinarily removes only the curing material at the surface of the product to a depth of perhaps $\frac{1}{16}$ to $\frac{1}{4}$ of an inch. It has been found in practice that the present invention results in a very much more uniform cure than it is possible to secure by any other known method. The short immersion which is given the product in the practice of the present invention, in addition to equalizing the cure, is of value in permitting the development of the characteristic ham flavor and the elimination of the undesirable porky flavor of the green ham.

I have described the application of the present invention to ham, merely by way of illustration and not by way of limitation. I have successfully carried out the invention in connection with many other types of meat products including beef, pork and mutton, and have treated such cuts as briskets, tongues, shoulders, hams, beef hams and others.

In practice the present invention is of great advantage in cutting down the curing time and producing uniformly cured product.

I claim:

1. The method of curing meat which consists in first chilling and then pumping curing pickle into the circulatory system to distend the collapsed arteries and thereafter immersing in a curing pickle a sufficient length of time to equalize the cure throughout the bulk of the meat and develop the flavor desired.

2. The method of curing hams which consists in first chilling and then dissecting out the iliac artery, pumping into the ham through such artery under a pressure of about ten pounds, to distend it, a quantity of curing pickle of approximately ten per cent by weight of the ham, said curing pickle consisting of a saturated sodium chloride solution and approximately 7% or 8% of sugar, .2% sodium nitrite and .2% sodium nitrate, and thereafter immersing in a curing pickle of sufficient strength to equalize the cure throughout the bulk of the meat and develop the flavor desired.

3. The method of curing hams which consists in first chilling and then dissecting out the iliac artery, pumping into the ham through such artery under a pressure of about ten pounds, to distend the collapsed arteries, a quantity of curing pickle of approximately ten per cent by weight of the ham, said curing pickle consisting of a saturated sodium chloride solution and approximately 7% or 8% of sugar, .2% sodium nitrite and .2% sodium nitrate and thereafter immersing in a curing pickle for two or three days to permit equalization of the cure and to improve the flavor.

L. SCOTT PADDOCK.